United States Patent [19]
Stover et al.

[11] Patent Number: 5,642,467
[45] Date of Patent: Jun. 24, 1997

[54] CONTROLLER FOR AUTONOMOUS DEVICE

[75] Inventors: James A. Stover, Spring Mills; Ronald E. Gibson, State College, both of Pa.

[73] Assignee: The Penn State Research Foundation, University Park, Pa.

[21] Appl. No.: 381,257

[22] Filed: Jan. 31, 1995

[51] Int. Cl.$^6$ .................................................. G05B 13/00
[52] U.S. Cl. ............................... 395/85; 395/22; 395/23; 395/62; 395/77
[58] Field of Search .................................. 395/11, 22, 23, 395/51, 85

[56] References Cited

U.S. PATENT DOCUMENTS

| | | | |
|---|---|---|---|
| 4,704,695 | 11/1987 | Kimura et al. | 395/54 |
| 4,842,342 | 6/1989 | Takahashi et al. | 303/186 |
| 4,860,213 | 8/1989 | Bonissone | 395/61 |
| 4,860,214 | 8/1989 | Matsuda et al. | 395/61 |
| 4,939,680 | 7/1990 | Yoshida | 395/60 |
| 4,984,174 | 1/1991 | Yasunnobu et al. | 395/61 |
| 5,058,033 | 10/1991 | Bonissone et al. | 395/61 |
| 5,121,467 | 6/1992 | Skeirik | 395/11 |
| 5,125,085 | 6/1992 | Phillips | 395/449 |
| 5,289,563 | 2/1994 | Nomoto et al. | 395/51 |
| 5,337,371 | 8/1994 | Sato et al. | 382/100 |

OTHER PUBLICATIONS

Churchland et al. "The Computational Brain," MIT Press, Cambridge, MA Dec. 30, 1993.

Stover et al. "Continous Inference Networks for Autonomous Systems," IEEE Conference On Neural Networks for Ocean Engineering, pp. 177–183. Aug. 17, 1991.

Brooks, "Intelligence Withous Representation," MIT Artificial Intelligence Laboratory Report, pp 1–22. Dec. 30, 1987.

Touretzky, "Inheritance Hierarchy" in Encyclopedia of Artificial Intelligence, 2nd Ed. Wiley and Sons. Dec. 30, 1992.

Hayes–Roth, "Rule–Based Systems" in Encyclopedia of Artifician Intelligence, 2nd Ed. Wiley and Sons. Dec. 30, 1992.

Nitzan, "Robotics" in Encyclopedia of Artificial Intelligence, 2nd Ed. Willey and Sons. Dec. 30, 1992.

Thorpe, "Robots, Mobile" in Encyclopedia of Artificial Intelligence, 2nd Ed, Wiley and Sons Dec. 30, 1992.

Gabriel, "LISP" Encyclopedia of Artificial Intelligence, 2nd Ed. Wiley and Sons Dec. 30, 1992.

L.A. Zadeh, "Fuzzy Sets", *Information and Control*, vol. 8, pp. 338–353 (1965).

James A. Stover and Ronald E. Gibson, "Continuous Inference Networks for Autonomous Systems", *IEEE Conference on Neural Networks for Ocean Engineering*, pp. 177–183, Aug. 15–17, 1991.

(List continued on next page.)

*Primary Examiner*—Robert W. Downs
*Assistant Examiner*—Ji-Yong D. Chung
*Attorney, Agent, or Firm*—Thomas J. Monahan

[57] ABSTRACT

A controller for directing the actions of an autonomous device in response to the existence or actions of objects in the physical world comprises program means for fusing physical world data and inferred property confidence factors into a plurality of representational instances, at least one representational instance having an inferred behavior interface property for soliciting a response of the autonomous device, program means stored in a random access memory for implementing a plurality of independent behavior instances for carrying out response tasks, program means stored in the random access memory for implementing a mission control task by generating a task list of behavior instances to be performed and program means stored in the random access memory for implementing an execution engine for executing the behavior instance at the head of the task list.

21 Claims, 3 Drawing Sheets

Microfiche Appendix Included
(1 Microfiche, 20 Pages)

OTHER PUBLICATIONS

Rodney A. Brooks, "Intelligence Without Representation", *MIT Artificial Intelligence Laborotory Report*, pp. 1–22 (1987).

James A. Stover, "Paradigms for Machine Intelligence: Reasoning versus Pattern Recognition", *ARL Penn State*, pp. 6–9 (1994).

R.E. Gibson et al., "An Autonomous Fuzzy Logic Architecture for Multisensor Data Fusion", 8 pages (Oct. 1994).

CONTROLLER FOR AUTONOMOUS DEVICE

MICROFICHE APPENDIX

Filed herewith is a microfiche appendix comprised microfiche having eighteen frames thereon setting forth one branch through a computer program in the LISP language for implementing a controller for an autonomous device as disclosed herein.

BACKGROUND OF THE INVENTION

This application relates to controllers for autonomous devices. An "autonomous device" is an apparatus that gathers information about its external world through sensors and uses that information to carry out its mission. By "controller" is meant a computer and computer program that does the information processing and decision making from gathering sensor voltage inputs to the issuing of commands to effector systems such as motor controls. The controller may be considered as having two interfaced sections; namely, a perception section and a response section. The perception section comprises sensor channels containing signal processing modules that perform operations such as filtering, Fourier transforms, detection and object localization. Part of the perception section may be a data fusion block which merges information over time and sensors to build internal representations of external world objects and/or events being detected by the sensors. These representations define the state of the autonomous device's external world and serve as a basis for the generation of responses by the response section.

Autonomous devices exist in and interact with the external world. Their perception is incomplete, limited by both the sensors themselves and the extent of processing of the sensor data. To the autonomous device, reality is the partial model of the external world that it builds to enable the device to carry out its mission. This model cannot be a purely mathematical model as the real world is too complex, unpredictable and incomplete to be modeled globally by mathematical functions. Moreover, the primary requirement of autonomous devices is that they be able to generate representations of and respond to objects or concepts outside of the mathematical domain, such as the concept of "an obstacle". This requires the generation of inferred properties by an inference network. The process by which the inference network recognizes properties, such as the existence of an obstacle, involves vagueness both in pattern assignment decisions and pattern definition (its properties and subpatterns). The need to be able to model vagueness for implementation of an inference network has been recognized for some time, the standard approach being that described in Zadeh, "Fuzzy Sets", *Information and Control*, Vol. 8, pp. 338–353. That approach can be thought of as a generalization of mathematical logic and set theory in a way that preserves most of set operations of Boolean algebra. For the purposes of the autonomous controllers described herein, there exists a better approach to fuzzy logic as described in our paper "Continuous Inference Networks for Autonomous Systems", *IEEE Conference on Neural Networks for Ocean Engineering*, Aug. 15–17, 1991.

The response section of an autonomous controller is keyed to the mission of the autonomous device and will produce different outputs (effector signals) in response to similar perceptions depending on the mission. The response processor may be one in which all variant responses of the autonomous device are generated within a unit. Another approach is exemplified by the architecture disclosed in Brooks, "Intelligence Without Representation", *MIT Artificial Intelligence Laboratory Report* (1987). In this approach, the response system is divided into disjointed layers, each knowing nothing of the internal content of other layers, but responding to the inputs of its own sensors and issuing its own effector signals. Overall system behavior is the aggregate for layer behaviors under the control of a network of output inhibitors. Once a layer gains control, it inhibits the action of other layers for a period of time.

A number of disadvantages of present controllers for autonomous devices are overcome according to the practice of applicants' invention as disclosed hereafter.

With prior known controllers for autonomous devices, software complexity grows with mission complexity and performance requirements causing the design to get bogged down in a mass of interacting details. It is an object, according to this invention, to minimize programming complexity in the configuration of a controller for an autonomous device to perform a given system notwithstanding the complexity of the mission.

With prior known controllers for autonomous devices, the ability of the controllers to adapt the performance of the device to changing conditions is limited. It is an object of this invention to improve the adaptability of a controller, that is, to improve machine intelligence.

It is an advantage, according to this invention, to provide an autonomous controller having the potential for expansion to higher intelligence levels without requiring new concepts.

It is a further advantage, according to this invention, to provide a general model of intelligence, not just for specific applications.

It is yet a further advantage, according to this invention, to provide a controller for an autonomous device that will operate indefinitely without becoming computationally intractable since it does not generate an exponentially increasing data base or decision tree to search.

It is a still further advantage, according to this invention, to provide a controller for an autonomous device that is highly efficient in terms of program size and execution speed, providing the potential for use in small, low cost systems.

It is an advantage, according to this invention, to provide a controller for an autonomous device that can be reconfigured to change its behavior and mission by installation of a new set of "orders".

SUMMARY OF THE INVENTION

Briefly, according to this invention, there is provided a controller for directing the actions of an autonomous device in response to mission orders and the existence of actions of objects in the physical world. The controller comprises a programmable computing system having at least one central processing unit, random access memory, and input/output channels, the input/output channels connected to data acquisition devices for gathering data about the physical world in the vicinity of the autonomous device and output effectors for outputting signals to effect the physical response of the autonomous device. The computer has stored in the random access memory a program for inputting the data relating to the physical world objects in the form of a stream of data vectors. Also stored in the random access is a program for implementing a continuous inference network for generating inferred property confidence factors related to objects in the physical world. Further stored in the random access memory is a program for repetitively fusing physical world data and inferred property confidence factors into a plurality of representational instances, the representational instances comprising a list of physical and inferred properties and their values and confidence factors, respectively. It is an improvement, according to this invention, that at least one representational instance has an inferred behavior interface property for soliciting a response of the autonomous device. It is a further improvement that stored in the random access memory is a program (a) for implementing a plurality of independent behavior instances for carrying out responses, (b) for implementing a mission plan by generating a list of behavior instances to be performed, and (c) a program means stored in the random access memory for implementing an execution engine for executing the behavior instance at the head of the list.

The continuous inference network is a classification network based upon a fuzzy logic in which the output confidence factor of any node in the network is representative of an inferred property. Preferably, the continuous inference network is a classification network in which the inputs to any node may be weighted by adjustable weighing factors and wherein at least one response includes an analysis function for adjusting at least one adjustable weighing factor in the continuous inference network.

A behavior instance includes at least one action function and associated goal achievement function for testing for completion of and/or modifying the action function, a plan designing function for generating a list of action functions to be performed to carry out a behavior response, and at least one goal achievement function for testing for completion and/or modifying of the behavior response.

Preferably, each behavior instance includes at least one action function and associated goal achievement function for testing for completion of and/or modifying the action function, a behavior response decision function for polling the behavior interface properties of at least one of the representational instances making a decision whether or not to request activation of the behavior response and generating activation requests, a plan designing function for generating a list of action functions to be performed to carry out a behavior response, the action functions sending signals to the input/output channels, and at least one goal achievement function for testing for completion and/or modifying of the behavior response.

Preferably, the program for implementing an execution engine which seriatim calls the current action function goal achievement function, calls the current behavioral response goal achievement function, calls a response decision function that polls response behavior objects to determine if any instance requests activation based upon the observation of a behavior interface property, calls a mission response decision from the mission manager, calls a function to activate the mission manager planning function to order or reorder the mission plan, calls for the execution of the next behavior response in the updated mission plan, calls for execution of the next action function in the updated behavior plan and sets response directives and repeats.

BRIEF DESCRIPTION OF THE DRAWINGS

Further features and other objects and advantages of this invention will become apparent from the following detailed description made with reference to the drawings in which.

DESCRIPTION OF THE PREFERRED EMBODIMENTS

Figure 1:
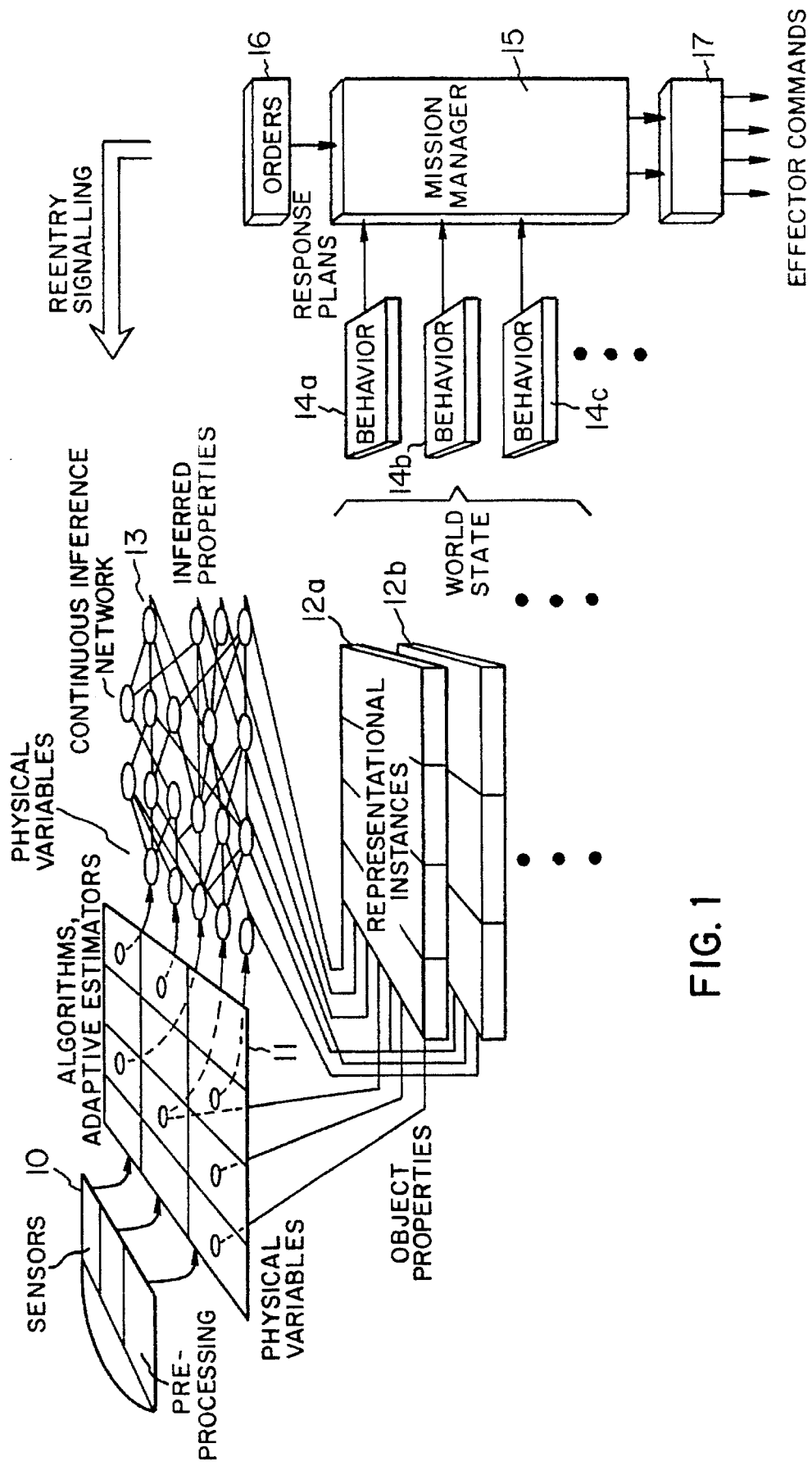
FIG. 1 is a schematic diagram illustrating the overall organization of the autonomous controller according to this invention.

Referring to FIG. 1, multiple sensing subsystems 10 are each designed to gather information of a particular type from time varying voltages in sensor elements. Initial processing 11 involves mathematical transformations of sensor signals to extract information and to discriminate signals from noise. This includes, for example, filtering, Fourier transforming, beam forming and estimation theories understood in the art. The outputs of the detectors and estimators are values of variables that represent physical concepts or properties such as distance, length, azimuth, signal-to-noise ratio (SNR) and speed for objects in the physical world that are being detected. These concepts or properties serve to form part of an internal description of the physical objects herein called representational instances 12a, 12b. Existence of physical properties is established once a detection decision has been made, although estimation error variances may be included by the estimator as a component of the variable. Since their existence is not a question, the values of physical variables are not considered to be vague or fuzzy.

Other properties, however, have to have their existence inferred from the values of the physical properties since they cannot be detected directly by the sensors. Consider, for example, the fuzzy property "landmark". (Property names are set forth in quotation marks.) Sensors do not output the existence of "landmark" directly, but rather physical variables allow the existence of "landmark" to be inferred. Suppose, for example, that an autonomous device is a vehicle assisted in its navigation by specially coded emitters placed at selected points, each code identifying a specific location. A continuous inference network 13 may be used to infer the truth of the fuzzy property "landmark" by other fuzzy properties such as "flashing", "blue" and "light" themselves being inferred by a hierarchy of fuzzy properties, all of which are ultimately inferred from physical properties. The continuous inference network comprises a plurality of nodes each of which is either an input node or an inferred property node. Each node is defined by a function which translates its inputs to an output, the numerical value of which is a confidence factor for the truth of the inferred property. The node functions may define sufficient conditions (OR nodes) or required conditions (AND nodes). Negation nodes and scaling nodes (BLEND nodes) may also form part of the continuous inference network. Input nodes are typically BLEND nodes. It is preferred, according to this invention, that the node functions be continuous, discriminatory of the ranges of all inputs and well behaved. The definition of fuzzy node functions (logical operators) as continuous, discriminatory functions implies that the transformation from physical variable space to property existence is a homeomorphism, that is, no information is lost. There are an infinite number of node functions that could be used to model AND nodes, OR nodes, BLEND nodes and other nodes. A particularly satisfactory set of node functions are described in our paper "Continuous Inference Networks for Autonomous Systems", *IEEE Conference on Neural Net-*

*works for Ocean Engineering*, Aug. 15–17, 1991 incorporated herein by reference.

Preferably, the continuous inference network 13 is a classification network based upon a fuzzy logic in which the output confidence factor of any node in the network being representative of an inferred property is a continuous and discriminatory function of the inputs to the node with an output confidence factor between zero and unity and in which the inputs to any node may be weighted by adjustable weighing factors.

Preferably, the inference network 13 is a classification network in which (a) the output of an AND node is the product of factors each of which is a function of an input, (b) the output of an OR node is the Euclidean norm mapped between zero and unity of factors each of which is a function of an input, (c) the output of a NOT node is the product of two factors, one of which is the input to be negated subtracted from one and the other is a global knowledge confidence factor being representative of the completeness of available physical world data, and (d) physical data inputs to the continuous inference network are scaled by a BLEND function to have values between zero and unity.

Figure 3:
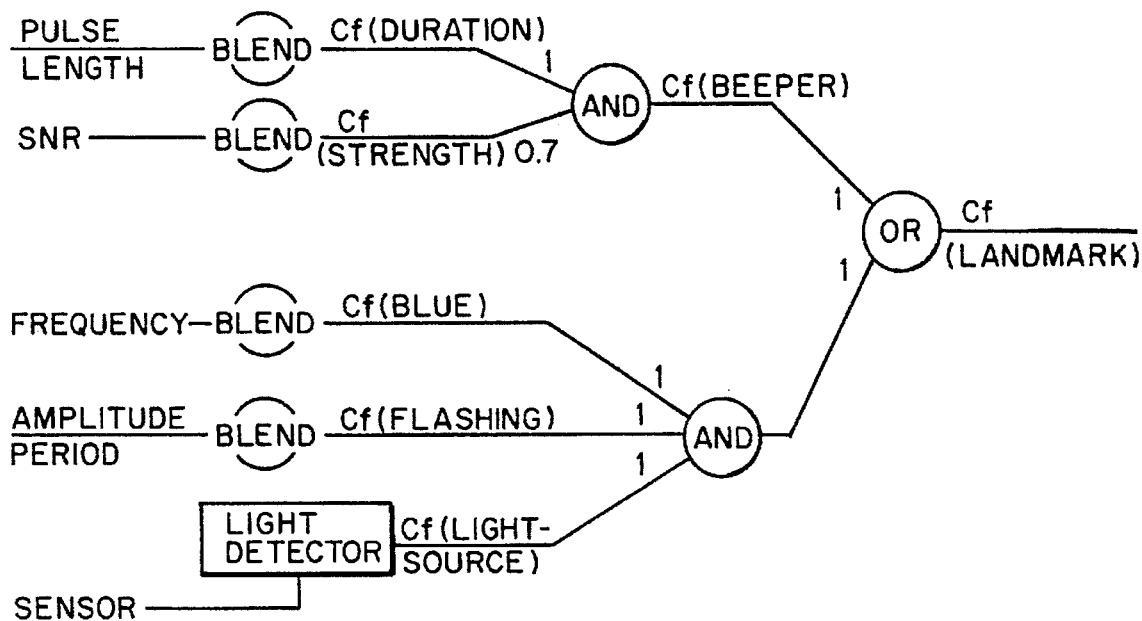
FIG. 3 illustrates a portion of a continuous inference network used according to this invention to infer properties.

Suppose an autonomous device is a mobile robot looking for a landmark and observes two light sources. FIG. 3 illustrates the portion of a continuous inference network for correctly determining which of the light sources is a landmark or for which the property "landmark" is true. Suppose further that the one light source is a bright star near the horizon. The star may barely pass the classification as "landmark" based upon confidence factors for the properties "blue", "flashing" and "light" represented by the input vector (0.1, 0.1, 0.1). On the other hand, the actual landmark detection may be having problems passing "blue" since its color has been shifted toward red, say, by intervening dust, but easily passes the other requirements. Its "blue-flashing-light" input vector is (0.1, 0.97, 0.92). If the decision has to be made at this time, the clear choice is the second light source. A mistake at this point can cause mission failure. Pursuing the star may cause the vehicle to crash. A discriminatory AND node will produce a higher confidence factor for the second object than the first.

The process of building the internal representation of objects or events in the physical world involves fusion of data over time and sensors. This is typically a discrete process, with m packets (input data vectors) of detection data presented to the fusion processor which decides which packet goes (correlates) with which of n existing representational instances (12a, 12b, Physical variables are updated by adaptive estimators and inferred properties by classifiers (segments the continuous inference network). The decision to assign a detection packet to a representational instance is then made by an algorithm that examines the m times n matrix of correlation confidence factors and picks the best mix of assignments. Mistakes in this assignment can cause confusion for the device since a representational instance will then hold properties generated from a mix of different external objects.

In a preferred embodiment, fusing is a repetitive process that determines which representational instances are to be updated with a given input data vector in the input vector stream by comparing the data vector with the corresponding physical property vector associated with each representational instance, applying each value of the comparison to a BLEND function wherein the upper and lower bounds are selected for each property to weigh each comparison and applying each BLEND output to a vague AND node to produce a confidence factor indicative of a match, updating the physical property vector of the representational instance so matched, but if no representational instance is matched, then adding a new representational instance and if after a predetermined time a representational instance is not matched, then deleting that representational instance.

Figure 4:
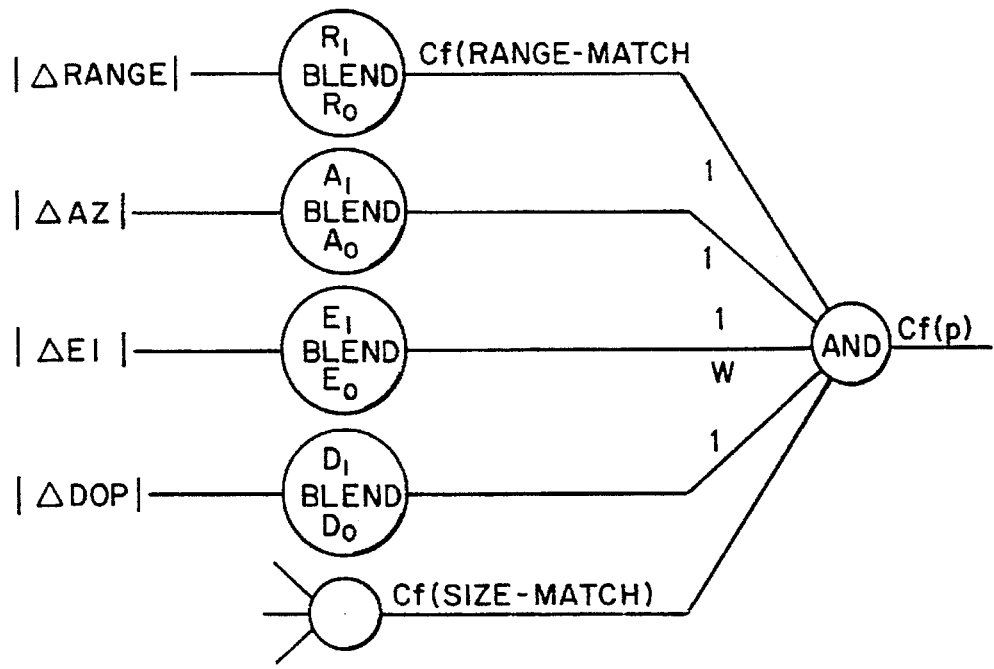
FIG. 4 illustrates a portion of a fusing network for correlating input vectors to representational objects.

Consider an input stream of vectors from a sonar system. Properties extracted by the sonar processor include "range", "azimuth", "elevation", "size" and "Doppler shift". The representational instances are formed by fusion of sonar data over time. The detection vector consists of this set of values for physical variables. Then the operator "is similar to" can be defined by the statement: "detection m is similar to object n if they are similar in size, close in range, azimuth, and elevation and have similar Doppler shifts". A continuous inference network to model this statement is shown in FIG. 4. The BLEND parameters (R1 and R0) define correlation gates for that property and may be computed as variables by functions that adapt them to the current situation. For example, during pursuit, it may be desirable to tighten the gates somewhat.

To this point, perception processing has been discussed, that is, how to generate an internal representation of the world external to the autonomous device. The behavior of the device is based upon this internal representation.

According to this invention, a plurality of independent response behavior instances 14a, 14b, 14c, . . . can be activated to control the activities of the autonomous device. The response behaviors are implemented in response to the world state defined by the representational instances 12a, 12b, 12c, . . . . Each of the representational instances may have inferred properties, such as "Pursue" or "Avoid", that solicit a response from one of the response behavior instances. Hence, the behavior instances do not respond directly to sensor inputs but to fuzzy properties of representational instances. The response (commands), however, may be tailored to the physical properties associated with one or more representational instances. The behavior interaction is controlled by a Mission Manager 15 (response behavior instance names are given initial capitals) which is a higher-level operation having the same internal structure as a behavior instance. The Mission Manager handles top-level strategy decisions such as which behaviors are allowed to become active. The Mission Manager may obtain external orders 16 at the start of a mission or at the change of the mission that control the overall behavior of the autonomous device. An activated behavior will issue effector commands 17 to control the physical response of the autonomous device.

The lines labeled "reentry signalling" are means by which higher-level processing adapts lower-level processing. The adaptation may occur at many levels, ranging from classifier weight changes to activation, tuning or deactivation of entire sensing subsystems.

The Mission Manager 15 generates and executes a plan of action for the autonomous device at a meta-level. It is implemented as a computer program instance with a function module for assembling a mission plan and a function module for making decisions on implementing interruptive behaviors. The Mission Manager stores the name of the currently active behavior instance's goal achievement function (GAF). The mission plan is a list of names of behavior instances to be executed in sequence to carry out a mission. This might be (Transit, Search, Transit) to get to the reconnaissance area, conduct the reconnaissance and return. Certain operations (such as Collision-Avoidance and Investigate-Closer) cannot be preplanned. They are implemented as interruptive (higher priority) behaviors. The response execution engine (to be described) observes the name of the next behavior instance on the mission plan and calls its activation function. That function sets the parameters needed by the behavior which may be with reference to extended orders 16 stored with the Mission Manager. GAFs for mission plan elements (behavior instances) look for conditions that should deactivate that element (e.g., arrival at the desired area to be searched when Transit is executed) or mission level adaptation when the need to activate Collision-Avoidance arises. As will be explained, mission GAF calls follow action GAF calls since the former need to consider the recommendations of the latter.

Each behavior instance has the same internal structure to implement the behavior class or pattern, enabling it to generate, execute and adapt a plan of action appropriate to its type of behavior. Typical behavior instances for an autonomous device used as a reconnaissance vehicle include Collision-Avoidance, Transit, Loiter, Search, Pursue, Escape, and so forth. The names given are indicative of the behavior's response. The organization of independent behavior instances provides modularization and development of generic processing for sensors and behaviors. A vehicle can be easily reprogrammed for different missions by activating appropriate sensing systems and behaviors and setting adaptation parameters to tailor processing to a specific environment.

The description of the internal structure of a behavior instance will be aided by considering a reconnaissance vehicle having at least Search, Collision-Avoidance and Investigate-Closer behavior instances. Search is looking to establish the existence of objects to be investigated (Investigate Objects), whereas Investigate-Closer may interrupt Search when a particular Investigate Object is detected. The requirements of the two operations are sufficiently different that implementation is with separate and independent behavior instances. Search requires wide area sonar coverage to maximize chances of an Investigate Object detection while Investigate-Closer requires accurate ranging and tracking and the elimination of distracting information. Two types of sonar modules are available; namely, active and passive. In the active mode, pulses are emitted by the reconnaissance vehicles transmitter, with object detection occurring whenever a replica of the transmitted pulse is received from a reflecting object. Two types of pulses are used, constant frequency (CF) and frequency modulated (FM), each having advantages in gathering certain information, and possibly occurring in combination. A transmitted pulse consists of a fundamental frequency (or band for FM) and a set of harmonics. The fundamental frequency is best for long range. The harmonics provide more detailed information at short range. The transmitted power of the fundamental and each harmonic are individually adjustable. In the passive sonar mode, audible spectra emitted by the Investigate Objects themselves are processed. Such information may be an important factor in classifying the Investigate Objects.

Executing a Search or Investigate-Closer operation requires selecting sonar modes and waveforms that are appropriate to the selected operation and tailoring transmitter and receiver processing parameters to the current situation. Suppose a sonar search cycle is specified to consist of two active CF pulses and their perception processing followed by a passive listening interval, this cycle being repeated as long as the Search behavior is activated. An operation plan for Search may then be the list of action function names (ACTIVE-CF, ACTIVE-CF, PASSIVE), the names identifying actions and the name list comprising a behavior plan. (Action function names are in capital letters.)

The first ACTIVE-CF action is assumed to be used for detection of large objects to generate a data base for guidance commands of both the Search and Collision-Avoidance responses. Therefore, it is set up with a long pulse length (for maximizing detection range), fixed output power and no higher harmonic processing. The second ACTIVE-CF action is for initial detection and representation of Investigate Objects and is set up with variable output power for both the fundamental tone and first harmonic, medium pulse length and first harmonic detection processing. The PASSIVE action is to provide additional classification data.

Each behavior instance (Search, Collision-Avoidance, Investigate-Closer) is implemented by a computer program object organized with a standard set of functional modules: a plan designing function for assembling the behavior plan, at least one action function and a set of goal achievement functions (GAFs).

As explained, a behavior plan is simply a list of action functions to be executed in sequence. For some behavior instances, such as Investigate-Closer, it may not be possible to plan the entire response since the Investigate-Closer behavior cannot be known in advance. In this case, the plan designing function may simply set a list of one action and regenerates this plan as often as needed. For other behavior instances, such as Transit, it may be feasible to write a plan designing function that will generate a plan for the entire Transit operation (where to go and how long to stay).

During execution of a plan, the first action name on the behavior plan is observed and an activation function (written specifically for that action) is called to set the parameters appropriate to that single sensory operation (as in the case of sonar). These parameters include command vectors to effector subsystems, such as the transmitter and guidance system, as well as adaptation parameters for the receiver and sensory processor. For the ACTIVE-CF action, these parameters may include for the transmitter, pulse length, power (fundamental and harmonics), beam width, etc.; for the guidance motors, azimuth, elevation, speed, etc.; and for the sensors, listening range (time), processing mode (CF), processing bands (harmonics), . . . GAF-name.

Each parameter is set by calling a function that computes a value appropriate to the current world state. For example, the function that sets the transmitter power level may set it to a fixed value for large objects on the first ACTIVE-CF action, but tailor it to the size of Investigate Objects currently being detected for the second ACTIVE-CF action.

The system may adapt in response to anomalies that occurred in the data obtained from execution of previous action functions. Functions that do the analysis and adaptation are called goal achievement functions (GAFs). Each action has a GAF written for it specifically. The activation function for each action will set the value of the parameter "GAF-name" to the name of that function. On subsequent entry to the response execution engine, which processes the mission plan and behavior plan, the GAF identified by "GAF-name" is called. Its effect may be a modification of the behavior plan or deletion of the action from the plan.

A GAF may be a very simple function that checks for existence of a few specified situations or a detailed, expert-system diagnostic, depending on the application. A simple example will be given for the Investigate-Closer behavior instance. Suppose Investigate-Closer generates the behavior plan (ACTIVE-FM, PASSIVE), the ACTIVE-FM being tuned to the needs of detecting, tracking and classification of a small moving object. Anomalies in the Investigate-Closer response include loss of detection due to the Investigate Object becoming obscured. The GAF for the ACTIVE-FM action would check for failure to detect with the transmitted FM pulse. If detection fails, the GAF may decide to repeat the ACTIVE-FM action with directives to its activation function that result in commands modified to increase chances of detection. After several failures to regain contact, the GAF may send a message to the Mission Manager that closer investigation is no longer possible, which may then result in the generation of a new mission plan, such as going back to Search.

The Collision-Avoidance behavior responds to instances of representational objects having a positive confidence factor for the inferred property "Obstacle". The response may be implemented by a single action named AVOID. The AVOID action would use data from all representational instances with the "Obstacle" property to compute guidance commands for the best avoidance path.

Figure 2:
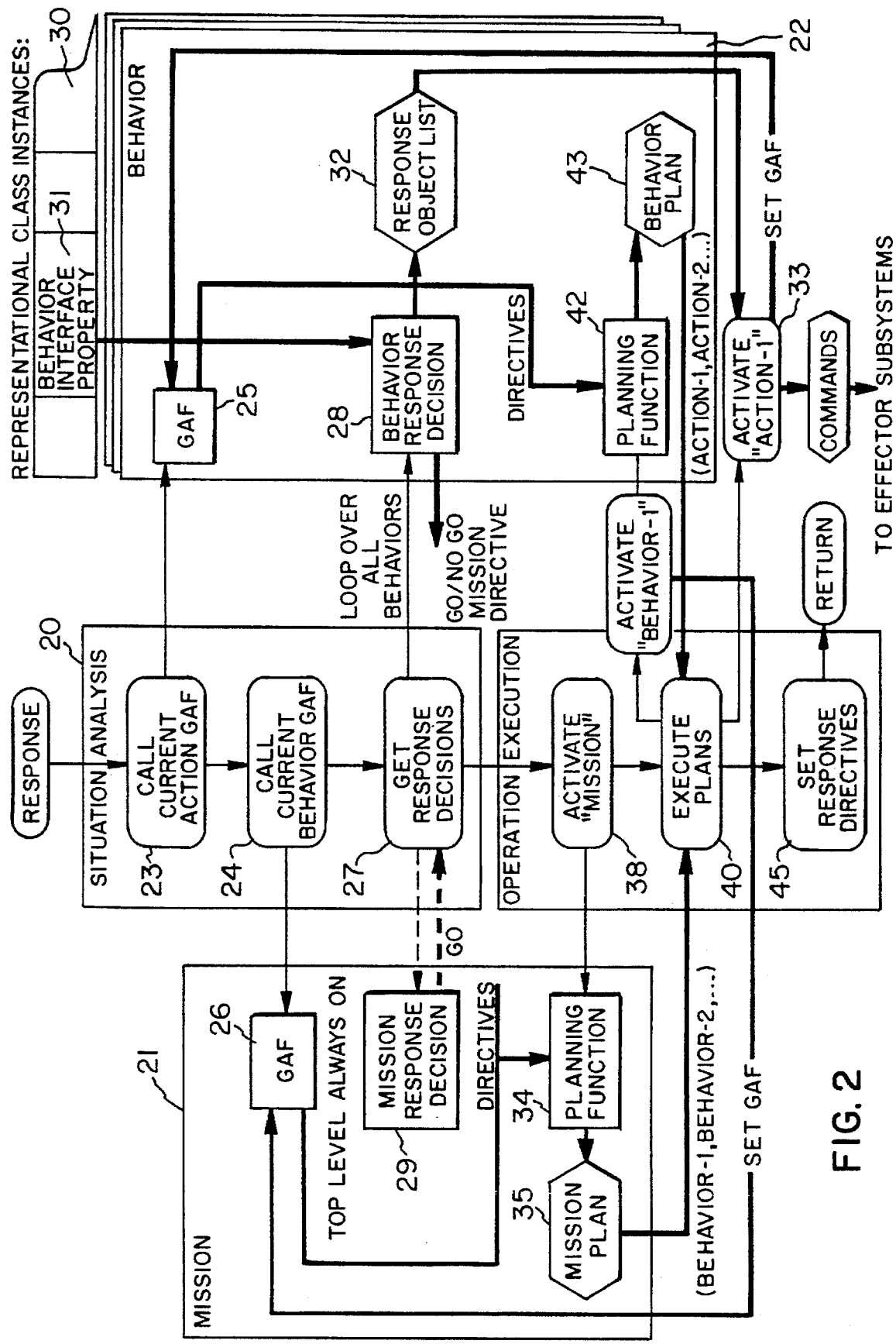
FIG. 2 is a flow diagram showing the interaction between the different parts of a computer program for implementing the response module of the controller illustrated in FIG. 1.

Having now described the functioning of the autonomous controller in a general way, we turn to the description of the computer program implementation of the controller with reference to FIG. 2.

The generation of response behavior by this controller differs from previous approaches in that, rather than executing a set of prewritten tactical sequences, the controller generates, executes, and adapts its own behavior "on the fly" using design, analysis, and decision-making functions provided by the controller designers. The way these modules interact is strongly constrained at the top level by the architecture, making processing at that level application independent.

The basic idea of the response architecture is to organize response operations into a hierarchy of levels; each level's operation defined by a list of operations to be performed from the next lower level. This list is referred to as the "plan" for that level; i.e., each level, or layer, generates a plan. Starting at the top level, the plan for that level will be instances of operational classes from the next lower level. This will be true for all levels down to the behavior level. At this level, the plan elements are the names of the action functions to be executed at the lowest level. As shown in Table I, each operational level is represented by a formal software object class, with instances of that class representing operation types at that level, for example, "Search" and "Pursuit" are names of operations that are instances of the layer referred to as "Behavior". The bottom level operational class, referred to by the name "Action", consists of atomic operations that cannot be further subdivided and thus do not generate a plan. Instances of this class have names that indicate an application-dependent atomic operation, for example, names such as "ACTIVE-FM" or "PASSIVE" to indicate a single acoustic cycle of a certain type.

TABLE I

| OPERATIONAL LEVELS | PLAN |
| --- | --- |
| • Task | (Mission-1, Mission-2, . . .) |
| • Mission | (Behavior-1, Behavior-2, . . .) |
| • Behavior | (Action-1, Action-2, . . .) |
| • Action | --- |

The next level above Behavior in the herein described exemplary embodiment is given the name "Mission". In more general applications, there could be multiple instances at this level, possibly indicating multiple vehicles or processes under control of a still higher level that would then become the top level.

In the specific example described, there is only one instance at the Mission level. Consequently, for simplicity, a separate top-level object class is not defined, but rather Mission Manager is just made an instance of the class Behavior using the same structure (slot variables). However, the code treats the top-level instance as if it were from the next higher operational class. Furthermore, at the bottom operational level, Action is not programmed as a formal object class. There are pros and cons to doing this; it seems a bit simpler not to make actions instances of a formal object class, although it could be done.

The Mission Manager and Behavior instances are instances of computer program objects of the class "Behavior" in an object oriented programming (OOP) environment. The representational instances are computer program objects of the class "Representational". (It would not be necessary to implement the autonomous controller in an OOP environment but it is convenient to do so.) Each Behavior instance has a number of slot variables defined in Table II for the prototype as follows:

TABLE II

| Slot Variable Name | Description |
| --- | --- |
| "Reference - GAF" | Contains name of Behavior GAF to be called by the next higher level. |
| "Live" | True/False indicates whether Behavior instance is active. |
| "Variant" | Message indicating Behavior variant. |
| "GAF" | GAF function name for current action. |
| "Response-Decision" | Response-Decision function name. |
| "LT-Directives" | List of situation identifiers-multi cycle. |
| "ST-Directories" | List of situation identifiers-single cycle. |
| "Response-Objects" | List of Representational class instances with appropriate behavior interface property. |
| "Planning-Function" | Plan generation function name |

The controller's outer shell is a function that calls the input data collection functions, the perception function, the response function (herein called the "Response Execution Engine") and then the command output function. For example, if the controller is implemented in the list processing language LISP, the highest level program function named RUN-RECONNAISSANCE might look as follows:

```
(DEFUN RUN-RECONNAISSANCE (DATASTREAM)
    (GET-DETECTION-DATA)
    (PERCEPTION)
    (RESPONSE)
    (OUTPUT)
)
```

This function is assumed to be a processing subsystem called by a main processor that handles a number of subsystems and continually loops through the subsystems. Hence, RUN-RECONNAISSANCE is repeatedly called.

The PERCEPTION function updates the world view of the autonomous device. It might be defined as follows:

```
(DEFUN PERCEPTION ( )
    (COND (SONAR
            (CORRELATE-IMAGES)
            (INITIATE-IMAGES)
            (MERGE-IMAGES)
            (DROP-IMAGES)
            (CLASSIFY)
            (UPDATE-OBJECT-DATABASES)
        )
    )
)
```

The functions with the word "IMAGES" in the name are data fusion functions for estimating physical properties. The CLASSIFY function implements the CINET to generate the confidence factors for various inferred properties. Details of LISP code for implementing the CLASSIFY and UPDATE-OBJECT-DATABASES functions for the prototype controller are found in the microfiche appendix.

The function RESPONSE implements responses appropriate to the real world defined by the PERCEPTION function. It generates and executes mission plans and behavior plans, i.e., it does the top level "thinking" and decision-making for the autonomous device.

FIG. 2 shows the interface of the Response Execution Engine 20 with the Mission level 21 and a typical Behavior instance 22. The central column of function blocks define the application-independent execution engine. For both the Mission level and Behavior instances, the internals of the GAF, Response-Decision, Planning and Action-Activation functions are application specific. Heavy lines indicate data flow and light lines denote function calls.

The LISP code for the RESPONSE function might be defined as follows:

```
(DEFUN RESPONSE ( )
    (LET*  ((BEHAV (BEHAVIOR-VARIANT *MISSION*))
            (BEH (EVAL BEHAV))
            (A-GAF (BEHAVIOR-GAF BEH)
            (B-GAF (BEHAVIOR-GAF *MISSION*)))
        (FUNCALL A-GAF)
        (FUNCALL B-GAF)
        (RESPONSE-DECISIONS)
        (ACTIVATE-BEHAVIOR *MISSION*)
        (EXECUTE-PLANS *MISSION*)
        (SET-OUTPUT-COMANDS)
        (SET-RESPONSE-DIRECTIVES)
    )
)
```

The LET* function finds the name of the current action GAF and assigns it to A-GAF and assigns the name of the current behavior GAF to B-GAF. These functions are then called by the execution engine at 23, 24, the action GAF 25 before the behavior GAF 26 since the latter relies on the analysis of the former. The action GAF determines if the active action has been completed or requires modification. The behavior GAF determines whether the behavior response has been completed or requires modification. GAFs monitor progress of a plan's execution and may modify a plan to try to correct observed problems by gathering certain sensory data, or send messages that alert other processing functions to situations the GAF has identified. These messages are carried by the Behavior slot variables "ST-Directives" (short-term directives) and "LT-Directives" (long-term directives). A GAF must be written for each operation instance, from Action on up.

Next at 27 the execution engine loops over all Behavior instances to execute the response decisions 28, 29 of each Behavior instance. The RESPONSE-DECISION function might be defined as follows:

```
(DEFUN RESPONSE-DECISIONS ( )
    (LOOP FOR B IN CONFIGURED-BEHAVIORS DO
        (FUNCALL (BEHAVIOR-RESPONSE-
                    DECISION B))
    )
)
```

CONFIGURED-BEHAVIORS is a list of all behavior instances including the Mission Manager, for example (Transit Avoid Investigate-Closer Mission). Thus, after the behavior response decision function of each Behavior instance is called, the mission activation function is called to arbitrate between the multiple requests, if any, presented to it by the behavior response decision functions and generate a mission plan.

If the Behavior instances available are the Transit, Collision-Avoidance, Investigate-Closer (each described above), each is asked if it wants something, that is, if it wants its response to be activated. Each Behavior instance has a behavior response decision function 28 that is unique to it and is based upon the information it derives from the Representational instances 30 having a positive confidence factor in the existence of the "Behavior Interface Property" 31. Hence, if Representational instances have a positive confidence in the existence of the property "Avoid" for one or more Representational instances, the Collision-Avoidance Behavior instance would request activation and make a list 32 of each Representational instance having that property.

The response decision functions queried by the execution engine as shown in FIG. 2 look for Representational instances that have the "Behavior Interface Property" (BIP) for that Behavior instance. For example, the BIP for Investigate-Closer is the (fuzzy) property referred to as "Investigate". Investigate-Closer behavior is interested in any Representational instance that has a positive confidence factor for Investigate as computed by the continuous inference network. The response decision function 27 may also impose additional requirements, such as checking to see that the Representational instance has not been archived (designated as a "secondary option"). Secondary options are application specific and are not required by the architecture. If Representational instances are found that pass all tests required by the response decision function 28, it will push a message onto the "ST-Directives" list for the next upper-level layer that it wants to respond and loads the acceptable Representational instances into its Slot-Variable "Response-Objects" 32. The "Response-Objects" list then serves as the database for action functions 33, in case the planning function 34 for the next upper level decides to allow Investigate-Closer to proceed. Response decision functions 28 are application dependent in their internals, but are required to be implemented by the architecture.

When situation analysis is completed, operation execution begins with a call to the top level planning function 34, in this application, the Mission planning function. That function takes into consideration all requests on its directives lines, and using programmed priorities (or decision analysis functions), decides what Behavior instances to activate, the mission plan 35 being a list of them in order of execution. The planning function may just continue the previous plan.

The (ACTIVATE-BEHAVIOR *MISSION*) function call 38 sets the mission operation active and calls its planning function which generates a mission plan which is a list of behavior instances in the order their responses are to be performed.

Planning functions generate plans to carry out operations, which as stated, are simply lists of operations from the next lower level. Behaviors are the lowest-level operations that generate plans, since in the level below them, the operations (actions) are atomic. Typically, planning functions are rather simple, possibly just setting the plan to a prescribed list. For example, for Investigate-Closer, it is not feasible to try to generate a complete Investigate-Closer plan to carry the vehicle into zero distance since there is no way subject behavior can be predicted reliably. Consequently, the plan is just set to the list of two actions (ACTIVE-FM, PASSIVE) to gather active and passive acoustic information, then regenerated whenever the plan is exhausted.

The execution engine then calls the EXECUTE-PLANS function 40, which observes the first name on the mission plan 35 and activates that behavior by calling its planning function. After that call, a behavior plan will exist (a list of Actions), and EXECUTE-PLANS then calls the activation function for the first action on the behavior plan 43. That function generates specific commands to the effector subsystems as appropriate to the action and the characteristics of the response object list 32. For example, activation of the action ACTIVE-FM would call functions that decide which of the subjects in the response object list for the Investigate-Closer should be selected (trying to home on all if possible), what beam sets are needed to cover them, and values for other commands such as listening range, waveforms (HD, LD, IMAGE, etc.), vehicle speed and heading.

The (EXECUTE-PLANS *MISSION*) function 40 takes the mission plan and acts upon it. It uses the mission plan to find the next Behavior instance to activate 41 the planning function 42 to assemble a behavior plan 43 for the the active Behavior instance and to call 33 the action at the front of the list.

Since we have chosen not to represent actions (the bottom level) as software objects, action activation is different in form from behavior activation in the prototype. Elements in a behavior plan (Actions), rather than being instances of classes, are defined as functions; i.e., the action "ACTIVE-FM" is not an instance of a class as is an element in a mission plan (e.g., Transit), but rather ACTIVE-FM is both the name of the action and the name of the action-activation function. Consequently, execution of a behavior plan consists simply of calling the next name on the behavior plan. That function then computes values of command variables, such as vehicle speed, heading, beam sets, listening range, etc., that are appropriate for that operation, using the list of Representational objects contained in the slot variable "Response-Objects" as a database.

Table III specifies which functions are allowed to set, read, delete, or clear "ST-Directives" and "LT-Directives" in the prototype controller. The intent of these specifications is to protect the programmer from generating a thicket of code setting, reading, and deleting information that becomes disorganized and difficult to trace, resulting in code execution errors. "ST-Directives" are cleared every cycle by the EXECUTE-PLANS function 40. This implies that the entire "ST-Directives" list is eliminated for all Behavior instances. Entries in "LT-Directives", on the other hand, are deleted by either the GAF or planning functions. Delete implies that only those elements in the list that the function is using may be purged from the list. This specification is in the prototype controller, but is not considered to be a hard requirement of the Response architecture.

TABLE III

| Authorized to: | Set | Read | Delete | Clear |
| --- | --- | --- | --- | --- |
| FUNCTION | | | | |
| GAF | ST, LT | ST, LT | LT | --- |
| RESPONSE DECISION | ST | --- | --- | --- |
| PLANNING | LT | ST, LT | LT | --- |
| ACTIVATION | --- | ST, LT | --- | --- |
| EXECUTE PLANS | --- | --- | --- | ST |

The last function called by the execution engine, SET-RESPONSE-DIRECTIVES, 45 generates a set of directives to adapt signal processing, tracking, and classification to the particulars of the upcoming cycle. For example, Representational instances that will not be covered by the beams being used will be sent a message so that they will not be downgraded by a failure to have a correlating detection.

Applications of the control for autonomous systems disclosed herein, in addition to the control of autonomous vehicles, would include process controllers (including complex computing networks in which decisions as to assignments cannot be written in optimal closed form), human advisory systems, and autonomous diagnostic systems.

Having thus defined our invention in the detail and particularity required by the Patent Laws, what is requested to be protected by Letters Patent is set forth in the following claims.

We claim:

1. A controller for directing the actions of an autonomous device in response to the existence or actions of objects in the physical world comprising:

a programmable computing system having at least one central processing unit, random access memory, and input/output channels, said input/output channels connected to data acquisition devices for gathering data about the physical world in the vicinity of the autonomous device and output effectors for outputting signals to effect the physical response of the autonomous device, program means stored in said random access memory for inputting the data relating to said physical world objects in the form of a stream of data vectors, program means stored in said random access memory for implementing a continuous inference network for generating inferred property confidence factors related to objects in the physical world, program means stored in said random access memory for repetitively fusing physical world data and inferred property confidence factors into a plurality of Representational instances, said Representational instances comprising a list of physical and inferred properties and their values and confidence factors, respectively, at least one Representational instance having an inferred behavior interface property for soliciting a response of the autonomous device, program means stored in said random access memory for implementing a plurality of independent behavior instances for carrying out response tasks, program means stored in said random access memory for implementing a mission control task by generating a task list of behavior instances to be performed wherein each said behavior instance includes at least one goal achievement function for testing for completion and/or modifying of the behavior response, and program means stored in said random access memory for implementing an execution engine for executing the behavior instance at the head of the task list.

2. The controller according to claim 1 wherein the continuous inference network is a classification network based upon a fuzzy logic in which the output confidence factor of any node in the network is representative of an inferred property.

3. The controller according to claim 2 wherein the continuous inference network is a classification network in which the inputs to any node may be weighted by adjustable weighing factors.

4. The controller according to claim 3 wherein at least one response task includes an analysis function for adjusting at least one adjustable weighing factor in the continuous inference network.

5. The controller according to claim 1 wherein each said behavior instance includes at least one action function and a plan designing function for generating a task list of action functions to be performed to carry out a behavior response.

6. A controller for directing the actions of an autonomous device in response to mission orders and the existence of actions or objects in the physical world comprising:

a programmable computing system having at least one central processing unit, random access memory, and input/output channels, said input/output channels connected to data acquisition devices for gathering data about the physical world in the vicinity of the autonomous device and output effectors for outputting signals to effect the physical response of the autonomous device, program means stored in said random access memory for inputting the data relating to said physical world objects in the form of a stream of data vectors, program means stored in said random access memory for implementing a continuous inference network for generating inferred property confidence factors related to objects in the physical world, program means stored in said random access memory for repetitively fusing physical world data and inferred property confidence factors into a plurality of Representational instances, said Representational instances comprising a list of physical and inferred properties and their values and confidence factors, respectively, at least one Representational instance having an inferred behavior interface property for soliciting a response of the autonomous device, program means stored in said random access memory for implementing a plurality of independent behavior instances for carrying out responses, each said behavior response instance including at least one action function and associated goal achievement function for testing for completion of and/or modifying the action function, a behavior response decision function for polling the behavior interface properties of at least one of said Representational instances, making a decision whether or not to request activation of the behavior instance and generating activation requests, a plan designing function for generating a task list of action functions to be performed to carry out a behavior response, said action functions sending signals to said input/output channels, and at least one goal achievement function for testing for completion or modifying of the behavior response, program means stored in said random access memory for implementing a mission control task for defining said mission plan by generating a task list of behavior instances to be performed and arbitrating between activation requests from behavior instances, and program means stored in said random access memory for implementing an execution engine which seriatim:

calls the current action function goal achievement function, calls the current behavior response goal achievement function, calls a response decision function that polls response behavior instances to determine if any instance requests activation based upon the observation of a behavior interface property and calls a mission response decision from the mission level, calls a function to activate the mission planning function to order or reorder the mission plan, and calls for the execution of the next behavior instance or the next action function, sets response directive and repeats.

7. The controller according to claim 6 wherein the continuous inference network is a classification network based upon a fuzzy logic in which the output confidence factor of any node in the network being representative of an inferred property is a continuous and discriminatory function of the inputs to the node with an output confidence factor between zero and unity.

8. The controller according to claim 7 wherein the continuous inference network is a classification network in which the inputs to any node may be weighted by adjustable weighing factors.

9. The controller according to claim 8 wherein at least one response task includes an analysis function for adjusting at least one adjustable weighing factor in the continuous inference network.

10. The controller according to claim 6 wherein the means for repetitively fusing determines which Representational instance is to be updated with a given input data vector in the input vector stream by comparing said data vector with the corresponding physical property vector associated with each Representational instance, applying each value of the comparison to a BLEND function wherein the upper and lower bounds are selected for each property to weigh each comparison and applying each BLEND output to a vague AND node to produce a confidence factor indicative of a match, and updating the physical property vector of the Representational instance so matched, but if no Representational instance is matched then adding a new Representational instance and if after a predetermined time a Representational instance is not matched then deleting that Representational instance.

11. The controller according to claim 6 wherein the data acquisition devices may be adjusted and at least one response task includes an action function for adjusting a data acquisition device to improve performance relative to the response task that has been initiated.

12. The controller according to claim 6 wherein the autonomous device is mobile and has a mission response task which includes a plan designing function for generating a list of behavior response tasks.

13. The controller according to claim 6 wherein the autonomous device is mobile and the behavior instances include a Collision-Avoidance task for directing the movement of the mobile device to avoid an obstacle in response to a high level confidence factor assigned to an "Obstacle" behavior interface property of a Representational instance.

14. The controller according to claim 6 wherein the autonomous device is mobile and the behavior instances include a Transit task for directing the movement of the mobile device to a location identified by the mission orders.

15. The controller according to claim 6 wherein the autonomous device is mobile and the behavior instances include a Pursue task for directing the movement of the mobile device to pursue an obstacle in response to a high level confidence factor assigned to a Pursue behavior interface property of a Representational instance.

16. The controller according to claim 6 wherein the programming means are implemented in an object oriented programming environment and the Representational instances are program objects of the class Representational and the Behavior instances are program objects of the class Behavior.

17. The controller according to claim 6 wherein the programming means are implemented in a list processing language enabling the plan designing functions to be redefined by the controller during operation.

18. The controller according to claim 6 wherein the continuous inference network is a classification network in which the output of an AND node is the product of factors each of which is a function of an input.

19. The controller according to claim 8 wherein the continuous inference network is a classification network in which the output of an OR node is the Euclidean norm mapped between zero and unity of factors each of which is a function of an input.

20. The controller according to claim 7 wherein the continuous inference network is a classification network in which the output of a NOT node is the product of two factors, one of which is the input to be negated subtracted from 1 and the other is a global knowledge confidence factor being representative of the completeness of available physical world data.

21. The controller according to claim 7 wherein the physical data inputs to the continuous inference network are scaled by a BLEND function to have values between zero and unity.

* * * * *

UNITED STATES PATENT AND TRADEMARK OFFICE
CERTIFICATE OF CORRECTION

| | |
|---|---|
| PATENT NO. | : 5,642,467 |
| APPLICATION NO. | : 08/381257 |
| DATED | : June 24, 1997 |
| INVENTOR(S) | : James A. Stover et al. |

Page 1 of 1

It is certified that error appears in the above-identified patent and that said Letters Patent is hereby corrected as shown below:

Column 1, Line 11, after "MICROFICHE APPENDIX" and before "BACKGROUND OF THE INVENTION" insert the following:

--GOVERNMENT SPONSORSHIP

This invention was made with Government support under Contract No. N00039-C-92-0100, awarded by the United States Department of the Navy, Naval Sea Systems Command (NAVSEA). The Government has certain rights in the invention.--.

Signed and Sealed this

Twenty-third Day of December, 2008

JON W. DUDAS
*Director of the United States Patent and Trademark Office*